United States Patent Office 2,977,374
Patented Mar. 28, 1961

2,977,374
PROCESS FOR PREPARING OXIRANE COMPOUNDS

Benjamin Phillips and Paul S. Starcher, Charleston, W. Va., assignors to Union Carbide Corporation, a corporation of New York No Drawing. Filed Mar. 7, 1958, Ser. No. 719,741

18 Claims. (Cl. 260—348.5)

This invention relates to the preparation of oxirane compounds. In one aspect this invention relates to the epoxidation, in an elongated reaction zone, of ethylenically unsaturated compounds with peracetic acid.

This application is a continuation-in-part of copending application Serial No. 439,878, now abandoned, entitled "Manufacture of Aliphatic Chloroepoxides," by B. Phillips and P. S. Starcher, filed June 28, 1954, and assigned to the same assignee as the instant application.

In recent years epoxide compounds have experienced a growing utility in a wide variety of fields. As a consequence, the epoxidation of ethylenically unsaturated compounds has become increasingly important as a means of synthesizing such epoxides. For example, 1,2-epoxy-3-butene has utility as a fumigant, as a source of vinyl ethylene carbonate, as a source of plastieizers, etc.; α,β,β-trialkyl substituted glycidic esters have shown promise as agents to prevent stem rust on oats; divinylbenzene dioxide as a reactant with polycarboxylic acids, anhydrides, and polyfunctional amines to prepare compositions having utility in the fields of coating, laminating, molding, bonding and potting; and so forth.

In the past various methods have been employed for the preparation of epoxide compounds. Darzens[1] disclosed the preparation of glycidic esters by reacting ketones or aldehydes with ethyl dichloroacetate and dilute magnesium amalgam, followed by hydrolysis of the product to produce a β-hydroxy-α-chloroester. Treatment of this intermediate with sodium ethoxide provided the glycidic esters. Pummerer and Reindel[2] reported the preparation of 1,2-epoxy-3-butene by the reaction of butadiene with perbenzoic acid in a sealed tube maintained under refrigeration for three to four days. Existing processes for the preparation of chloroepoxides employ the halohydrin route for the synthesis of these compounds. The commercial process for the preparation of epichlorohydrin is an example of the halohydrin route and involves the addition of hypochlorous acid to allyl chloride and subsequent dehydrohalogenation with sodium hydroxide to produce epichlorohydrin, salt, and water.

It is apparent that the foregoing epoxidation routes suffer from several disadvantages. For example, among the disadvantages resulting from the use of Darzen's process are included small yields, undesirable side reactions, wide boiling point ranges of many reported glycidic esters indicating the presence of impurities, recommended use of an inert atmosphere, and others. The Pummerer et al. route is extremely limited and employs a most expensive source of oxygen in the epoxidation step. Lastly, the halohydrin route requires, for example, one mol of hypochlorous acid and one mol of base to produce epichlorohydrin from allyl chloride.

Heretofore the interaction of a peracid and an ethylenically unsaturated compound to produce the corresponding epoxide was generally conducted at atmospheric pressure in a vessel large enough to contain all the material employed. Such batchwise operation, in order to permit a reasonable degree of productivity, had to be of considerable size. Moreover, at any given temperature, the rate of epoxidation was controlled by the rate at which the peracid was fed into the vessel. Under such conditions, once the reaction was completed with, for example, the first amount of peracid fed to the entire charge of the contained ethylenic compound, the epoxide so produced could not be removed as it was formed. Rather, the entire charge was retained in the vessel until the reaction was essentially complete. Among the disadvantages of the foregoing procedure are the following: undue exposure of the excess ethylenic compound over the available peracid to temperatures above normal storage temperature thus inviting or enhancing polymerization of the excess ethylenic compound; undue exposure of the epoxide product to the effects of the resulting acetic acid by-product; the use of excessively long reaction times with the upper reaction temperature limit controlled by the atmospheric boiling point of the lowest boiling material present in the reaction mixture; and others.

The present invention is directed to epoxidation reactions which can be continuously carried out at reaction rates, efficiencies, and/or yields heretofore unobtainable or contemplated. The epoxidation process of the instant invention is effected by introducing an ethylenically unsaturated compound and peracetic acid into an elongated reaction zone under critically controlled conditions regarding the operative pressure, the residence time of the reaction mixture, and the length and smallest diameter or smaller cross-sectional area of said elongated reaction zone to be described hereafter. The epoxidation reaction is thus conducted at a temperature in the range of from about 0° C. to below about 150° C., preferably from about 20° C. to below about 130° C., with the maximum residence time of the reaction mixture in the elongated reaction zone not exceeding about 45 minutes. Pressure sufficient to maintain the reaction mixture in the liquid phase is necessary.

The elongated reaction zone is preferably a uniform tubular reaction zone, the periphery of a perpendicular cross-sectional view of which defines a circle. Thus, the diameter (D) of the circular cross section of the tubular reaction zone must be between 0.25 inch to 5.0 inches, and the length (L) of the tubular reaction zone is from about 100 to 10,000 times this diameter (D). The elongated reaction zone also can be a tubular zone wherein the periphery of perpendicular cross-sectional views are circular throughout but not uniform in size, i.e., area, such as conical-shaped reaction zones. In such cases the diameter (D) referred to above is the diameter of the smallest circular cross section, area-wise, of the reaction zone and the length (L) referred to above is the over-all length of the reaction zone. It is emphatically pointed out, however, that the elongated reaction zone is not limited to uniform or non-uniform tubular reaction zones such as those illustrated previously, but rather, the elongated reaction zones can be uniform and/or non-uniform in perpendicular cross-sectional views taken along the length of the reaction zone, and the periphery of these perpendicular cross-sectional views can define an ellipse, square, rectangle, triangle, quadrilateral, polygon, annulus, multilateral planar figure, or other configurations. When the perpendicular cross-sectional view of the elongated reaction zone defines an annulus (such as would be formed, for example, by a thermocouple well within a tubular reaction zone), the diameter (D) referred to above is the diameter of the outer circle of a perpendicular cross-sectional view of the annulus taken at the narrowest point in the elongated reaction zone. When the elongated reaction zone is such that the perpendicular cross-sectional ---
[1] Organic Reactions, by Adams et al., volume 5, pages 413–439; published by John Wiley and Sons, Inc., 1952.
[2] Ber. 66B, 335–9 (1933).

view cannot be expressed in terms of diameter (D) such as in those cases where said view defines a multilateral planar figure, for example, a triangle, quadrilateral, polygon, or an ellipse, or other geometrical configurations, then the critical limits of the elongated reaction zone are expressed in terms of length (L) and the expression $\sqrt{4K/\pi}$ wherein K is the area of the figure obtained by the perpendicular cross-sectional view taken at a point in the elongated reaction zone which represents the smallest cross-sectional area. The expression $\sqrt{4K/\pi}$ is arrived at as follows: The area (K) of a circle equals $\pi D^2/4$; hence D is equal to $\sqrt{4K/\pi}$.

Thus, in summary the elongated reaction zone is critically defined by the diameter (D) or the expression $\sqrt{4K/\pi}$ and the length (L) wherein the diameter (D) is the smallest diameter of a circle obtained by a perpendicular cross-sectional view of the elongated reaction zone; wherein K is the smallest area of the figure obtained by a perpendicular cross-sectional view of the elongated reaction zone (the expression $\sqrt{4K/\pi}$ being used when the appropriate cross-sectional view defines a figure not geometrically measurable in trems of diameter); and wherein L is the length of the elongated reaction zone. Moreover, the diameter (D) or the expression $\sqrt{4K/\pi}$ must fall between 0.25 to 5.0 inches and the length (L) is 100 to 10,000 times the value assigned to D or $\sqrt{4K/\pi}$.

It is also pointed out that a single elongated reaction zone, or a plurality of elongated reaction zones, whether said zones are uniform or non-uniform and whether identical or dissimilar in design or structure, can be employed. The elongated reaction zone or zones can be arranged in parallel or series fashion to meet the thermal requirements of the system employed. When the elongated reaction zones are arranged in series, the several zones, considered as a unit, must conform to the same requirements. It is also pointed out that the process of the instant invention must be conducted in the liquid phase and under pressure sufficient to maintain the reaction mixture in the liquid phase.

The residence time of the reaction mixture must not exceed about 45 minutes. In other words, the entry of a unit mass of reaction mixture into the elongated reaction zone exits from said zone in less than about 45 minutes. Thus, though the diameter D or the expression $\sqrt{4K/\pi}$ and the length L are fixed within the boundaries previously set out, the criticality regarding the residence time further realistically defines the elongated reaction zone. When the elongated reaction zones are arranged in parallel fashion, each individual elongated reaction zone must conform to the aforesaid requirements for diameter (D) or the expression $\sqrt{4K/\pi}$ and the length (L). Consequently, modifications of the elongated reaction zone will be limited not only by the variables D or $\sqrt{4K/\pi}$ and L noted above, but also, by the ability of the pumping means contemplated which must be sufficient to push or flow a unit mass of the reaction mixture through the elongated reaction zone in less than about 45 minutes.

The advantages accruing by the practice of the instant invention are many, and, indeed, highly unexpected and surprising. In the first place, epoxide compounds can be prepared from the corresponding ethylenically unsaturated compounds, e.g., propylene, butadiene, etc., which are too volatile to be converted economically into epoxides by conventional batchwise nonpressurized methods. Secondly, the epoxidation reaction is a liquid phase reaction conducted under perssure sufficient to maintain the reaction mixture in the liquid phase. Peracetic acid is widely known to be a highly elusive, explosive, degradative organic compound; moreover, the detonability and degradation of peracetic acid increases with increased temperature. At an operative temperature of 125° C. a solution of 40 weight percent peracetic acid in acetic acid decomposes at the rate of 3,000 percent per day (over 120 percent per hour).[3] It will be noted in operative Example 11 that ethyl crotonate was epoxidized to ethyl 2,3-epoxybutyrate in a pressurized system at 125° C. Under the operative conditions employed in said Example 11 at least 91 percent of the peracetic acid (after thermal decomposition reduced the original concentration from 25 weight percent to 17.5 weight percent solution in ethyl acetate) was available for epoxidation and that at least 96 percent of this available peracid was utilized in the preparation of the epoxide. It should also be noted that the residence time of a unit mass of reaction mixture in the reaction zone was approximately 9.9 minutes. It is short of astounding and highly unexpected and surprising, indeed, that such efficiencies and yields are obtainable by the practice of the instant invention in view of the instability of peracetic acid and the heretofore unobtainable or contemplated fast reaction rates. Thirdly, the practice of the instant invention results in substantially no diffusion of product with the incoming reagents. In contrast to conventional batchwise epoxidation processes wherein peracetic acid was introduced into an excess of an ethylenic compound thus inviting, among other disadvantages, polymerization of the ethylenic compound, undue exposure of the epoxide product to the ring opening effect of the acetic by-product, etc., the instant invention subjects the reaction mixture to residence times ranging from about seconds to below about 45 minutes after which the epoxide product, unreacted reactants, by-product, etc., can be recovered by conventional means such as fractionation, distillation, extraction, and the like. Fourthly, the operative temperature of the elongated reaction zone can be carefully and effectively controlled by means of heat exchange equipment, for example, a heat exchange jacket encompassing the external surface of the reaction zone. Fifthly, it should be noted that at all times an excess of peracetic acid over ethylenic material can be employed if desired, a procedure which in many instances would be hazardous in batchwise operation.

Accordingly, one or more of the following objects will be achieved by the practice of the instant invention.

It is an object of this invention to provide a novel process for epoxidizing ethylenically unsaturated compounds. It is another object of this invention to provide a novel continuous process for effecting the epoxidation of ethylenically unsaturated compounds with peracetic acid through a critically defined elongated reaction zone previously described. It is a further object of this invention to provide a novel continuous epoxidation process at reaction rates heretofore not contemplated or obtainable with an amazing and unexpected degree of efficiency and yield of product resulting. Another object of this invention is to provide a continuous, liquid phase epoxidation process under controlled temperature conditions in an elongated reaction zone. Other objects will become apparent to those skilled in the art in the light of the instant specification.

As stated previously, the instant invention is directed to the epoxidation of ethylenically unsaturated compounds. By the term "ethylenically unsaturated compound," as used herein (including the appended claims), is meant an organic compound which contains at least three carbon atoms and which has one or more aliphatic double bonds, i.e., $>C=C<$, in which the atoms directly joined to the ethylenic carbon atoms are hydrogen or carbon. For sake of brevity the above quoted term oftentimes will be referred to as "ethylenic compound(s)." Stated in other words, by the term "ethylenically unsaturated compound," as used herein, which can be epoxidized by the process of this invention, are hydrocarbons, halogenated hydrocarbons, alcohols, ethers, ketones, mono-unsaturated acetals, acids, esters, amides, imides, nitriles, and phosphoric esters, which compounds are characterized by having at least one aliphatic double bond and which are free of

[3] Encyclopedia of Chemical Technology, First Supplement Volume (1957), pages 623–626; published by the Interscience Encyclopedia, Inc., New York.

elements other than carbon, hydrogen, oxygen, nitrogen in the form of amido, imido, or cyano groups, phosphorus in the form of phosphoric esters, and halogens, and wherein the atoms joined to the ethylenic group, i.e., >C=C<, to be epoxidized are of the group consisting of hydrogen and carbon atoms.

Illustrative ethylenic hydrocarbons which can be employed as reagents in the epoxidation process include, among others, propene, butenes, pentenes, hexenes, heptenes, octenes, decenes, dodecenes, octadecenes, butadiene, isoprene, pentadienes, hexadienes, heptadienes, octadienes, decadienes, dodecadienes, octadecadienes, styrene, divinylbenzenes, dihydronaphthalenes, indene, stilbene, 1-phenyl-1-propene, 1,1-diphenylene, cyclopentenes, cyclohexenes, cyclopentadiene, dicyclopentadiene, vinylcyclohexenes, alkyl-substituted cycloalkenes, alkyl-substituted cycloalkadienes, aryl-substituted alkadienes, aryl-substituted cyclopentenes, unsaturated macromolecules such as butadiene polymer and copolymers, and the like.

Examples of alcohols and phenols containing ethylenic unsaturation therein are exemplified by compounds such as 3-cyclohexenylmethanol, p-allylphenol, p-crotylphenol, dicrotylphenols, p-(2-cyclopentenyl)phenol, 3-penten-1-ol, 5-decen-1-ol, 9-octadecen-1-ol, 2-ethyl-2-hexenol, 3-cyclopentenol, 4-cyclohexenol, alkyl-substituted alkenols, aryl-substituted alkenols, cycloalkenols, cycloalkadienols, alkyl-substituted cycloalkenols, cycloalkenyl-substituted alkanols, alkenylphenols, and the like.

Exemplary unsaturated ethers which are contemplated include, among others, diallyl ether of diphenylolmethane; diallyl ether of 2,2-diphenylolpropane; diallyl ether; butyl crotyl ether; 2-pentenyl butyl ether; 4-pentenyl butyl ether; 4-octenyl 3-pentenyl ether; ortho-allylphenyl ethyl ether; butyl 3-dodecenyl ether; 2,4-diallylphenyl ethyl ether; 3-cyclohexenylmethyl alkyl ethers; 3-cyclohexenylmethyl aryl ethers; 4-decenyl 2-propenyl ether; 1,4-pentadienyl alkyl ether; 1,4-alkadienyl alkenyl ether; and the like.

Illustrative nitrogen-containing compounds, e.g., unsaturated amides, imides, nitriles, and the like, amenable as starting material include 3-pentenenitrile, 4-pentenenitrile, 4-cyanocyclohexene, ortho-, meta-, and para-vinylbenzonitrile, 3-pentenamide, 4-pentenamide, oleamide, ortho-, meta-, and para-vinylbenzamide, 3-cyclohexene-1-carboxamide, N-crotylmaleimide, N-crotylphthalimide, N-allyl phthalimide, and the like.

Among the unsaturated carbonylic compounds, e.g., unsaturated ketones, acids, esters, and the like, which can be employed in the instant process include, for example, vinylacetic acid, oleic acid, cinnamic acid, soybean oil, linseed oil, linoleic acid, mesityl oxide, allyl acetate, allyl methacrylate, crotyl acrylate, α-phenyl-β-pentenyl α-benzylcrotonate, β-pentenyl α-ethyl-β-propylacrylate, octyl β,δ-pentadienoate, crotyl α-cyclohexylcrotonate, 2-ethylhexyl oleate, 2-cyclopentenyl crotonate, glycol dioleate, vinyl α-ethyl-β-propyl-β-butylacrylate, 4-decenoic acid, methyl allyl ketone, methyl 2-pentenyl ketone, diallyl maleate, vinyl α-tolyl-β-ethylacrylate, 2-ethylhexyl α-methyl-β-ethylacrylate, propyl 1-cyclohexenecarboxylate, butyl α,γ-diethyl-α,γ-pentadienoate, methyl α-phenyl-α,γ-hexadienoate, tolyl β-phenethyl-γ-butyl-α,γ-heptadienoate, phenyl 1-cyclopentenecarboxylate, tolyl 2-methyl-1-cycloheptenecarboxylate, 2-ethylhexyl 6-methyl-3-cyclohexenecarboxylate, butyl 2-phenyl-1-cyclohexenecarboxylate, allyl 2-benzyl-2,3-epoxyhexanoate, 3 - cyclohexenylmethyl acetate, 3 - cyclohexenylmethyl acrylate, 3-cyclohexenylmethyl acylates, ethylene glycol bis(2-butenoate), propylene glycol bis(acrylate), 1,5-pentanediol bis(2-butenoate), 1,3-butylene glycol crotonate 2,3-epoxybutyrate, ethylene glycol methacrylate 2-methyl-2,3-epoxypropionate; aryl, alkenyl, cycloalkyl, cycloalkenyl, alkaryl, alkyl, and aralkyl alkenoates; aryl, alkenyl, cycloalkyl, alkyl, cycloalkenyl, alkaryl, and aralkyl alkadienoates; aryl, alkyl, alkenyl, cycloalkyl, cycloalkenyl, alkaryl, and aralkyl cycoolefin-1-carboxylates; alkylene glycol bis(2-alkenoates); alkylene glycol 2-alkenoate 2,3-epoxyalkanoates; and the like.

Illustrative mono-unsaturated acetals include, for example, 1,2,5,6-tetrahydrobenzaldehyde diethyl acetal, paravinylbenzaldehyde dibutyl acetal; the dialkyl acetals of alkenals, such as the dimethyl, diethyl, dipropyl, diisopropyl, dibutyl, dihexyl, di-2-ethylhexyl, didecyl, etc., acetals of unsaturated aliphatic aldehydes, for example, 2-, 3-, 4-, etc., alkenals, and the like.

Typical unsaturated phosphoric esters which can be employed include, among others, di-(2-butenyl) 2-ethylhexyl phosphate, tri-(crotylphenyl) phosphate, allyl diphenyl phosphate, dioctyl 3-pentenyl phosphate, and the like.

The unsaturated halogenated hydrocarbons amenable as starting material are those which do not contain halogen atoms joined directly to the ethylenic carbon atoms, >C=C<. A particularly preferred class of unsaturated halogenated hydrocarbons are the aliphatic haloalkenes, e.g., aliphatic chloroalkenes which contain from 3 to 10 carbon atoms in the alkene chain and in which no more than two of the carbon atoms alpha to the ethylenic group, >C=C<, contain but a single halo substituent thereon.

Illustrative unsaturated halogenated hydrocarbons which can be employed include allyl chloride, crotyl chloride, 1,4-dichloro-2-butene, 3,4-dichloro-1-butene, 3-chloro-1-butene, 2-chloro-3-pentene, 2-ethyl-2-hexenyl chloride, methallyl chloride, crotyl fluoride, crotyl bromide, ortho-, meta-, and para-chlorostyrene, ortho-, meta-, and para-chloromethylstyrene, 1-chloro-3-vinylcyclohexane, 4-(trichloromethyl) - 1-cyclohexene, tetra-(chloromethyl) ethylene, 1-chloro-4-fluoro-2-butene, parabromobenzylethylene, and the like.

The epoxidation reaction can be conducted at a temperature in the range of from about 0° to below about 150° C., and preferably from about 20° to below about 130° C. As a practical matter, the choice of the particular temperature at which to effect the epoxidation reaction within the broad temperature range set out depends, to an extent, on the nature of the ethylenic compound, the pressure employed, the residence time (hereinafter described), and other factors. To maintain the desired operating temperature the elongated reaction zone, for example, can be suspended in or jacketed by heat exchange media. Of course, other conventional means can be employed to maintain the desired operating temperature.

The operative pressure should be sufficient to maintain a liquid phase epoxidation reaction. This factor will be mainly governed by the boiling point of the lowest boiling component comprising the reaction mixture at the operating temperature. For example, when normally gaseous butadiene is the ethylenic compound to be epoxidized and a reaction temperature of 60° C. is employed, it will be necessary to apply above about 8 atmospheres to the system to maintain a liquid phase reaction. Should it be desirable to effect the epoxidation of butadiene at 115° C., then a pressure above about 23 atmospheres would be necessary to maintain a liquid phase reaction mixture. By way of further illustration, normally gaseous propylene can be maintained in the liquid phase at 50° C. by applying above about 20 atmospheres to the system; at a reaction temperature of 100° C. a pressure about 50 atmospheres is essential.

In general, the pressure will be in the range of from about atmospheric pressure, preferably slightly above atmospheric pressure, to about 1,500 p.s.i.g. depending, of course, on the nature of the ethylenic compound reagent and the operative temperature. It is evident, therefore, that the instant invention provides a process for preparing epoxides from ethylenic compounds which are too volatile to be converted into epoxides by conventional batchwise non-pressurized methods. Moreover, the unexpected and unobvious results obtained by conducting the epoxidation reaction in the liquid phase is, indeed, highly surprising especially when one considers the elusive, explosive and degradative nature of peracetic acid under the operative conditions of the instant process.

It has been observed that a faster and cleaner reaction is effected by employing the peracetic acid in an inert organic medium such as ethyl acetate, acetone, and the like. It has also been noted that better control and/or conversion can be achieved by employing a solution of peracetic acid. A solution comprising from about 5 to 50 weight percent of peracetic acid, based on the total weight of peracetic acid and inert organic medium, is satisfactory; from about 10 to 30 weight percent of peracetic acid, based on the solution weight, is prefered. An inert organic diluent not containing active hydrogen can be employed with the ethylenic compound reagent, if desired, to provide moderation of the exothermic reaction, and also, said diluent can serve as an azeotroping agent in the product recovery stage.

Theoretically, to effect substantially complete epoxidation of the ethylenic compound reagent, at least a stoichiometric quantity of peracetic acid per carbon to carbon double bond of ethylenic compound should be employed. It has been observed, however, that the ratio of peracetic acid to ethylenic compound will depend, to an extent, on the nature of the ethylenic compound, i.e., on the number of carbon to carbon double bonds possessed by said ethylenic compound, on the ease of oxidation of the ethylenic bond(s), on the ease of recovery of excess ethylenic compound and/or peracetic acid, on the operative temperature, and other factors. In general, a molar ratio of peracetic acid to carbon to carbon double bond of ethylenic compound of about 0.05 to 5.0 is satisfactory; a molar ratio of peracetic acid to carbon to carbon double bond of ethylenic compound of about 0.2 to 2.0 is preferred.

It is desirable to conduct the epoxidation reaction with equipment which will not foster the polymerization of the ethylenic compound or catalyze the decomposition of peracetic acid. The equipment should be of sufficient strength to withstand the operating pressures contemplated by the practice of the instant invention. Equipment constructed of stainless steel, aluminum and the like has been observed to be adequate for this purpose. If desired, a polymerization inhibitor or retarder such as hydroquinone, 2,4-dinitrophenol, 2,4-dinitro-m-cresol, pyrogallol, phenyl-beta-naphthylamine, t-butylcatechol, and the like can be incorporated into the reaction mixture in an amount sufficient to prevent possible polymerization of the ethylenic compound starting material.

The particular manner of adding or introducing the reagents, i.e., the ethylenic compound and peracetic acid, to the elongated reaction zone is not narrowly critical. One desirable procedure is to have one stream containing ethylenic compound and another stream containing a solution of peracetic acid converge at the entrance or prior to the entrance of the elongated reaction zone. Another method which can be employed is, for example, to introduce the solution of peracetic acid, at a plurality of points or intervals, into the stream containing the ethylenic compound. By way of further illustration, the peracetic acid and ethylenic compound reagent can be premixed and maintained below that temperature at which epoxidation occurs. The resulting feed mixture then can be pumped into the elongated reaction zone, said zone being maintained under the predetermined operative conditions at which the epoxidation reaction is to be conducted.

In general, the resolution of the liquid effluent from the reaction zone can be effected by conventional techniques such as distillation, fractionation, extraction, crystallization, and the like. Once the reaction mixture leaves from the elongated reaction zone and enters, for example, a pot or still, the reaction mixture is somewhat similar to that which remains at the termination of a batchwise epoxidation process. Normally the effluent will comprise unreacted ethylenic compound reagent, epoxide product, peracetic acid, acetic acid by-product, minor amounts of residual materials from degradation of the ethylenic compound and/or epoxide product, solvent for the peracetic acid, is employed, and solvent for the ethylenic compound, if employed. A preferable procedure for resolving the liquid effluent comprises continually removing said effluent from the elongated reaction zone into the lower half of a continuous still, and removing solvent, acetic acid, unreacted peracetic acid, and unreacted ethylenic compound as a heads fraction or distillate. The tails, or residual fraction, then can be continuously fed into a second similar still wherein the epoxide product is removed as a distillate. Of course, other recovery procedures, whether a continuous or a batchwise operation, can be employed such as an intermittent batchwise distillation of collected reactor product stream; single- or multi-stage jacketed stripping coils suitable for isolation of a high boiling or residue product; crystallization techniques; and other conventional recovery means.

In the practice of the instant invention the apparatus setup is capable of various modifications with the exception that the elongated reaction zone is restricted to the limits set out previously regarding the diameter (D) or the expression, $\sqrt{4K/\pi}$, and the length (L), and further, by the fact that the residence time of any unit of the reaction mixture does not exceed about 45 minutes. Thus, for example, the ethylenic compound and peracetic acid solution can be supplied to the elongated reaction zone by means of controlled-volume positive-displacement pumps. The pump controls can be regulated so that the predetermined ratio of peracetic acid to ethylenic compound entering the reaction zone is constant. As stated previously, the individual peracetic acid stream and ethylenic compound stream can converge at the entrance of the reaction zone or prior thereto. Alternatively, either the peracetic acid stream or the ethylenic compound stream can be introduced at a plurality of evenly or unevenly spaced intervals in the system. Moreover, the peracetic acid solution and ethylenic compound can be premixed in the desired or predetermined ratios and maintained below the epoxidation reaction temperature, and subsequently, the resulting premixed feed can be introduced into the reaction zone. The rate at which the feed charge is pumped into the elongated reaction zone depends, in part, on the desired produciton rate, the ratio of peracetic acid and ethylenic compound, the extent of thermal decomposition of peracetic acid which, though minor in extent, always takes place, the residence time within the range stated previously, the over-all optimum conditions desired, and other factors. It should be noted, however, the feed rate is sufficient to insure a residence time in the range of from seconds to less than about 45 minutes. Within the critical limits defining the elongated reaction zone, it has been observed that a relatively longer reaction zone is desirable for expoxidation reactions which take place at higher temperatures or with difficulty. A relatively narrower elongated reaction zone is often superior to a reaction zone of wider average cross-sectional area in view of the greater efficient thermal control which can be achieved by the use of heat exchange jackets, baths, coils, etc. A thermocouple well in the interior of the elongated reaction zone attached to a suitable temperature recording device can serve to apprise the operator of temperature variations, if any.

As also noted previously, the instant process concerns epoxidation reactions in the liquid phase, and pressure sufficient to maintain the reaction mixture in the liquid phase is employed. Conventional pressure maintaining devices can be employed. They can be, for example, mechanical or hydraulic in operation and differ only in their details of construction. It is preferred to employ a controlling type pressure device which will permit flow only when the reaction zone pressure exceeds the desired and established operating level. Examples include spring-loaded check valves, air-to-close diaphragm valves, and various types of pressure-activated motorized valves. As a safety device the reaction zone can also contain a pressure relief valve. It is emphatically pointed out, however, that the instant invention is not to be construed as limited to the various optional apparatuses set forth above; those skilled in the art can readily determine, for example, the particular heat exchanger, pressure device, etc., which they choose to employ.

The following examples are illustrative.

*Example 1*

A mixture of 1.15 mols of a 24.0 weight percent solution of peracetic acid (also containing 26.2 weight percent acetic acid and 49.8 weight percent ethylbenzene) and 11.5 mols of propylene was placed in a pressurized vessel under refrigerated conditions (below about minus 20° C.) such that no interaction between peracid and olefin took place. Subsequently, this mixture was pumped over an 83 minute period through a ¼ inch stainless steel tube having a 150 milliliter volume, said tube being suspended in a water bath maintained at 60° C. The reaction mixture in the elongated tubular reaction zone was maintained in the liquid phase by supplying 950–1050 p.s.i.g. pressure thereto. The reaction mixture was exhausted under its own pressure into a receiver. The entire reaction product was diluted with 100 milliliters of acetaldehyde to decompose unspent peracetic acid, and then the resulting mixture was added to 200 milliliters of dry acetone. This mixture was distilled in a Davis[4] column and a fraction distilling from 0° to 56° C. was analyzed for propylene oxide by the pyridine hydrochloride-pyridine method. The results showed that 30 grams of propylene oxide were present which corresponded to a yield of 44.8 percent based on the peracetic acid charged.

*Example 2*

A solution of 364 grams (1.5 mols of a 31.4 weight percent solution) of peracetic acid in acetic acid containing 0.1 weight percent of Victor Stabilizer 53,[5] based on the weight of the solution, and 622 grams (14.8 mols) of propylene were placed in a pressurized feed tank and pumped through a ¼ inch stainless steel coil which had a volume equal to 150 milliliters. The operative temperature in the elongated tubular reaction zone was 90° C.; the reaction mixture was maintained in the liquid phase under 950–1050 p.s.i.g. pressure; the residence time was 2.85 minutes. Once steady operating conditions were achieved 71.5 weight percent of the reaction mixture was taken under its own pressure into a separate cylindrical receiver. This material was diluted with 100 grams of acetaldehyde and 200 grams of dry acetone and distilled in a Davis column. The fraction boiling from 19° C. to 75° C. was analyzed for propylene oxide. A total of 53.5 grams was thus ascertained which represented a yield of 86 percent of the theoretical amount.

*Example 3*

A charge of 850 grams of isobutylene (15 mols) and 509 grams of a 22.4 weight percent solution of peracetic acid in ethyl acetate (1.5 mols) was placed in a stainless steel cylinder and maintained under refrigerated conditions (below about minus 20° C.) such that no epoxidation reaction took place. Subsequently, this mixture was pumped through a ¼ inch stainless steel (18–8) coil which had a volume equal to 150 milliliters. Super-atmospheric pressure supplied by means of a motor valve at the effluent end of the elongated tubular reaction zone maintained the reaction mixture in the liquid phase at an operative temperature of 50° C. The residence time was 2.5 minutes. The major portion (69.2 weight percent of the feed charge) of the effluent, taken under the operative conditions prevailing in said reaction zone, was introduced into a separate receiver under its own pressure and then distilled in a Davis column. The material boiling between 20° and 79° C., at atmospheric pressure, was collected in one fraction. This fraction was analyzed for isobutylene oxide by the pyridine hydrochloride-pyridine method and was found to contain 84 weight percent of the theoretical amount of said isobutylene oxide.

*Example 4*

In this experiment a reaction between butadiene and peracetic acid in ethyl acetate was carried out in a tubular reaction zone under sufficient pressure to keep the reactants liquefied. The tubular reaction zone comprised a single length of ½ inch stainless steel pipe 12 feet long, with a ⅜ inch thermocouple well extending the full length. Temperature measurements were made by thermocouples located at several points in the thermocouple well.

All of the tubing and fittings, and other equipment which came in contact with peracetic acid were made of 18–8 stainless steel. Peracetic acid solution was fed by volume under 30 p.s.i.g. nitrogen pressure from a calibrated tank, and butadiene was fed by weight under 60 p.s.i.g. nitrogen pressure. The pump was a Milton-Roy duplex reciprocating pump with cooling jackets on the valve bodies. The reaction zone was jacketed; liquid "Dowtherm A"[6] circulating therein afforded the means for controlling the operative temperature. Pressure in the reaction zone was maintained essentially constant by means of a motor valve at the outlet. The product was collected under its own vapor pressure in stainless steel cylinders sufficiently cooled to condense the components of the reaction mixtures.

In this operation, 3510 grams of a 12.3 weight percent solution of peracetic acid in ethyl acetate and 1674 grams of butadiene were simultaneously fed into the reaction zone over a period of 1.75 hours. The reaction temperature was 68° C.; a pressure of 350 p.s.i.g. maintained the reaction mixture in the liquid phase; and the residence time was 7.4 minutes. The conversion of peracid was found to be 95.6 percent. Subsequent laboratory distillation of the reaction mixture gave 271 grams of butadiene monoxide having the following properties.

Boiling point _____ 67.5°–68°C./atm.
n 30/D _____ 1.4120–1.4122.

The yield was 68 percent of the desired product.

*Example 5*

Butadiene monoxide (630 grams) and peracetic acid (905 grams of a 25.2 weight percent solution in ethyl acetate) were fed simultaneously from individual positive-displacement controlled-volume pumps at a molar ratio of 3 mols of butadiene monoxide to 1 of peracid into a tubular reaction zone. The reaction zone was fabricated from a 48 inch length of ⅜ inch stainless steel tubing jacketed with a one inch iron pipe through which a heat exchange fluid (dioctyl phthalate) was circulated. The total volume of the reaction zone was 47 milliliters. The reaction zone was operated at a jacket temperature of 110° C.; a system pressure of 80 to 115 p.s.i.g. applied by an air operated diaphragm-controlled valve maintained the reaction mixture in the liquid phase. The reactants were fed over a period of 1¾ hours into said zone; the residence time was 3.0 minutes. The effluent from the

---

[4] A distillation column incorporating a silver coated vacuum jacket throughout the length of the column.
[5] Victor Chemical Co. trademark for Na₅(2-ethylhexyl)₅-(P₃O₁₀)₂, an anionic wetting agent.
[6] Dow Chemical Co. trademark for a eutectic mixture of diphenyl and diphenyl ether.

reaction zone was exhausted to atmospheric pressure through a cooling condenser and continuously fed into a stirred slurry comprising 11 mols of anhydrous sodium carbonate in 500 cc. of ethyl acetate which was maintained over a temperature range of 20° to 25° C. At the termination of the feed period the slurry was filtered; subsequent analysis of the filtrate showed it to be essentially free of the acetic acid by-product. Distillation of the filtrate at 300 mm. of Hg pressure served to remove the ethyl acetate therefrom. Subsequent fractionation through a packed column gave recovered excess butadiene monoxide and 113 grams of butadiene dioxide having a boiling point of 65°–66° C. at 50 mm. of Hg pressure and an $n\ 30/D$ equal to 1.4265–1.4270. This represented a yield of 43.8 percent.

Example 6

Epichlorohydrin was prepared continuously by passage of a mixture of allyl chloride and peracetic acid solution through a ⅛ inch stainless steel coil which had a volume of 67 milliliters. The feed charge consisted of 530 grams of allyl chloride, 0.95 cc. of a 35 weight percent solution of Victawet 35B [7] in acetic acid, and 451 grams of a 27.4 weight percent solution of peracetic acid in acetone. The reaction mixture was maintained in the liquid phase by applying 75 p.s.i.g. nitrogen pressure at an operative temperature of 100° C.; the residence time was 36.5 minutes. Subsequent stripping under reduced pressure of the effluent from the reaction zone (to remove the excess chloroalkene and acetone), followed by dilution of the residue with 500 grams of carbon tetrachloride and then water washing, removed the acetic acid. The resulting oil phase was then distilled under reduced pressure. The yield of epichlorohydrin was 86 percent based on the available peracetic acid consumed (96.2 percent).

Example 7

Epichlorohydrin was prepared continuously by passage of a mixture of allyl chloride and peracetic acid solution through a ⅛ inch stainless steel coil which had a volume of 67 milliliters. The feed charged consisted of 530 grams of allyl chloride, 0.95 cc. of a 35 weight percent solution of Victawet 35B in acetic acid, and 451 grams of a 27.4 weight percent solution of peracetic acid in acetone. The reaction mixture was maintained in the liquid phase by supplying 75 p.s.i.g. nitrogen pressure at an operative pressure of 100° C.; the residence time as 17.4 minutes. Subsequent stripping under reduced pressure of the effluent from the reaction zone (to remove the excess chloroalkene and acetone), followed by dilution of the residue with 500 grams of carbon tetrachloride and then water washing, removed the acetic acid. The resulting oil layer was then distilled under reduced pressure. Based on 89 percent of the available peracetic acid consumed, an 81.5 percent yield of epichlorohydrin was obtained.

Example 8

A tubular reactor for the continuous preparation of styrene oxide was set up according to the following discussion. Peracetic acid (24.8 weight percent in ethyl acetate solution) was fed from one positive displacement controlled volume pump while styrene containing 0.5 weight percent of dinitrochlorophenol as a polymerization inhibitor was fed from a similar pump into a tubular reaction zone consisting of a coiled length of ⅛ inch stainless steel tube having a volume of 66 milliliters. The pump rates were adjusted to provide a molar ratio of peracetic acid to styrene into the reaction zone of 0.678 at a contact time of 4 minutes. The temperature of the reaction zone was maintained at 60° C. by suspension of said zone into vapors of a refluxing azeotrope of water and methyl acetate (80 weight percent methyl acetate). A reaction pressure of 21.5 p.s.i.g. maintained by a spring loaded check valve provided a liquid phase reaction mixture. The effluent from the reaction zone was fed continuously into the middle of the column of a continuous still containing styrene inhibited with 1 weight percent of dinitrochlorophenol at the start of the operation. With this still operating at 25–30 mm. of Hg pressure with a calandria temperature of 125° C. (supplied by a circulating heat exchange fluid), the crude product stream was withdrawn from the base of the still while the other volatiles were removed as a distillate. The crude product stream was continuously flash distilled from polymer and other residual materials by pumping the material into a flash evaporator at 200° C. at 4–5 mm. of Hg pressure. An 81 percent yield of styrene oxide was continuously obtained from the overall operation.

Example 9

In a reaction zone similar to that employed in Example 8, an equimolar mixture of vinylcyclohexene and vinylcyclohexene monoxide was allowed to react with peracetic acid in ethyl acetate solution such that total consumption of peracid would provide a mixture of vinylcyclohexene dioxide and vinylcyclohexene monoxide. The latter material was used in subsequent operations since the use of a stream comprising vinylcyclohexene and vinylcyclohexene monoxide was found to be more efficient than use of vinylcyclohexene alone. Thus, at a reaction temperature of 69° C. and a contact time of 4 minutes, yields of 80.5 percent of vinylcyclohexene dioxide based on the peracid used were achieved. Operative pressures of 21–24 p.s.i.g. were employed to maintain the reaction mixture in the liquid phase.

Example 10

Solutions of commercial divinylbenzene (diluted with an equal weight of ethyl acetate) and peracetic acid (28.4 weight percent in ethyl acetate) were fed by controlled-volume positive-displacement pumps into the elongated tubular reaction zone described in Example 5. Over a 3¼ hour period, peracetic acid was fed at the rate of 940 ml./hr. while the divinylbenzene solution was fed at a rate of 474 ml./hr. During this period 2,000 grams of divinylbenzene-ethyl acetate solution (with 4 grams of 2,4-dinitrochlorobenzene as a polymerization inhibitor) and 3784 grams of the peracetic acid solution had been supplied to the reaction zone. The reaction zone jacket temperature was maintained at 70° C.; the pressure was between about 80–115 p.s.i.g.; the residence time was 2 minutes. The reaction was sufficiently exothermic to elevate the liquid reaction mixture to 98–102° C. in transit through the reaction zone. Analysis of the effluent showed a conversion of 95 weight percent based on the period actually consumed.

The effluent from the reaction zone was passed continuously into a steam-jacketed coil type stripper equipped with a cyclone separator operated at 98° C. at 75 mm. of Hg. This equipment effectively removed the major part of the volatile materials present which were predominantly ethyl acetate and acetic acid. This was followed by a second stripper similarly constructed and operated at 5 mm. of Hg pressure at 98° C. The residual liquid was rapidly flash distilled from the residue material and analyzed for epoxide content. In all, 572 grams of distillate were collected. Analyses by the pyridine hydrochloride-pyridine showed the presence of 59 weight percent of divinylbenzene dioxide in the product mixture. On the knowledge that the starting material contained 55 percent divinylbenzene, this represented a process yield of 49.3 percent of divinylbenzene dioxide.

Example 11

In this example the equipment described in Example 5 was employed. At a jacket temperature of 125° C. and a system pressure of 100 p.s.i.g., peracetic acid and ethyl crotonate were fed into the reaction zone at rates of 160

---

[7] Victor Chemical Co. trademark for $Na_3(2\text{-ethylhexyl})_5(P_2O_{10})_3$.

cc./hr. and 125 cc./hr., respectively. After six hours, 701 grams (6.15 mols) of ethyl crotonate and 945 grams (3.10 mols of a 25 weight percent solution in ethyl acetate) of peracetic acid had been fed into said zone. The residence time was 9.9 minutes. Analysis, at the operative temperature, showed that thermal decomposition reduced the peracetic acid to an effective concentration of 17.5 percent and that a conversion of 91 percent of peracid to other products was observed. Conventional distillation under reduced pressure gave 275 grams of ethyl 2,3-epoxybutyrate having a boiling point of 96° C. at 50 mm. of Hg; $n$ 30/D equal to 1.4154; and purity by saponification analysis equal to 98.7 percent. This represented a yield, based on the peracid fed and consumed, of 96.2 percent.

*Example 12*

Utilizing the equipment described in Example 5, the epoxidation of 6-methyl-3-cyclohexenylmethyl 6-methyl-3-cyclohexenecarboxylate was carried out as follows. At an average reaction temperature of 64° C. and a system pressure of 120 p.s.i.g., peracetic acid in ethyl acetate (26.7 percent by weight) was fed at a rate of 695 cc./hr. simultaneously with the above mentioned ethylenic reagent at a feed rate of 253 cc./hr. over a 2 hour and 45 minute period. The residence time was 3 minutes. Analysis of the effluent indicated that an amount of peracetic acid sufficient to convert all of the ethylenic reagent to epoxide had been consumed. The liquid effluent from the tubular reaction zone was continuously introduced into a steam-jacketed stripping coil equipped with a cyclone separator at an operating pressure of 24 mm. of Hg. This served to remove the majority of the ethyl acetate, acetic acid, and unspent peracetic acid. The effluent from this equipment was also continuously fed into a second similar piece of equipment operated at steam temperature and 1 mm. of Hg pressure. Analyses of the residue product gave a purity of 88.7 weight percent as 6-methyl-3,4-epoxycyclohexylmethyl 6-methyl-3,4-epoxycyclohexanecarboxylate. The product was obtained in quantitative yield.

*Example 13*

The tubular reaction zone in Example 5 was modified by applying two jacketed sections to the length of the reaction zone instead of only one jacket applied over the entire length of said zone. This permitted application of cooling to the terminal reaction zone or the applications of circulated heat exchange fluid at a temperature different from that maintained around the first stage of the reaction zone. In addition, the reaction zone was refabricated from a 48 inch section of ½ inch stainless steel tubing equipped with a ¼ inch stainless steel thermowell extending the entire length of the zone. This allowed for observation of thermal conditions at any point in said zone. No modifications were made in the feed or pressure regulating systems. The working volume of the reaction zone was found to be 79 milliliters. Normal operating pressure for this equipment was 110–120 p.s.i.g.

Using the equipment described above, 2.17 mols (602 grams) of oleic acid diluted with 235 grams of ethyl acetate was fed into the reaction zone over a 2 hour and 35 minute period at a rate of 330 cc./hr. Simultaneously, 2.95 mols of peracetic acid in ethyl acetate (778 grams of a 28.9 weight percent solution were fed into the reaction zone over the same period at a rate of 300 cc./hr. The residence time was 1.3 minutes. At a reaction temperature of 75° C., analyses showed that essentially 98 percent of the theoretical amount of peracid had reacted with said oleic acid. The liquid effluent was introduced into a steam jacketed stripping coil at 50 mm. of Hg pressure to remove the volatile material therefrom. The residual product from this operation was diluted with an equal volume of ethyl benzene and repassed through the stripping equipment twice at 1–2 mm. of Hg pressure. A total weight of 670 grams of solid product analyzing 88 percent purity as epoxystearic acid (by the conventional pyridine hydrochloride in pyridine procedure) was obtained, representing a yield of 91.1 percent of the theoretical amount of product. An iodine value of 3.93 established that the major part of the residue product was, indeed, non-olefinic in nature.

*Example 14*

Using the equipment described in Example 13, 3-cyclohexenecarbonitrile was converted into 3,4-epoxycyclohexanecarbonitrile. The candidate ethylenic reagent was introduced into the reaction zone which was maintained at 79° C. at a feed rate of 275 cc./hr. over a 2-hour period. In all, 4.87 mols (521 grams) of said ethylenic reagent was thus supplied. Simultaneously, peracetic acid (30.0 weight percent in ethyl acetate) was introduced into the reaction zone at a feed rate of 665 cc./hr. over the same period of time. In all 5.25 mols (1327 grams) of the peracid solution was utilized. The operative pressure was 110–120 p.s.i.g. and the residence time was 2 minutes. Analyses indicated that total conversion of the ethylenic reagent was achieved under these conditions. The liquid effluent was passed through a steam jacketed stripping coil at 45 mm. of Hg operating pressure to remove the volatile components from the reaction mixture. The mixture was then diluted with 500 milliliters of ethyl benzene and repassed through the stripping coil to complete the removal of acetic acid. Finally, the remaining material was distilled under reduced pressure to obtain the product. In all, 452 gm. of 3,4-epoxycyclohexanecarbonitrile was obtained having the following properties: boiling point of 67° C./0.3 mm. of Hg to 80° C./0.4 mm. of Hg; $n$ 30/D equal to 1.4719–1.4723; purity by pyridine hydrochloride method equal to 98.7 percent. This represented a yield of 75.6 percent of the theoretical amount.

*Example 15*

The equipment described in Example 13 was employed to prepare bis(2,3-epoxycyclopentyl) ether. Bis(2-cyclopentenyl) ether was fed into the reaction zone at a rate of 154 cc./hr. over a three-hour and ten-minute period such that 2.76 mols (417 grams) of the unsaturated ether reagent were consumed in the operation. Peracetic acid (29.3 weight percent in ethyl acetate) was fed simultaneously to the reaction zone at a feed rate of 600 cc./hr. until 7.33 mols (1900 grams) of the solution had been utilized over the same period of time. The operative temperature was 76° C. and the pressure was maintained at 110–120 p.s.i.g. The residence time was 1.6 minutes. Volatile materials were removed from the liquid effluent by means of a conventional steam-jacketed stripping coil equipped with a cyclone separator. The resulting crude product was rapidly distilled from nondistillable residue material and then carefully redistilled to remove any unconverted ether reagent or monoepoxidized ether. The material distilling in the range from 105° C./2 mm. of Hg to 120° C./2.5 mm. of Hg was collected as product. In all, 316 grams of material analyzing 94 percent as bis(2,3-epoxycyclopentyl) ether was collected. This represented a yield of 63.7 percent of bis(2,3-epoxycyclopentyl) ether.

*Example 16*

The equipment described in Example 13 was employed in the preparation of 2,3-epoxy-2-ethylhexanol. At a reaction temperature of 90° C. and a pressure of 110–120 p.s.i.g., 2-ethyl-2-hexenol and peractic acid (29.8 weight percent in ethyl acetate) were simultaneously introduced into the reaction zone over a 2 hour and 35 minute period. In all, 4.50 mols (577 grams of 2-ethyl-2-hexenol were supplied at a feed rate of 268 cc./hr., while 5.13 mols (1307 grams) of the peracid solution were utilized at a feed rate of 509 cc./hr. The residence time was 1.65 minutes. The liquid effluent was exhausted into a still operating at 50 mm. of Hg pressure and containing refluxing ethylbenzene in order to facilitate azeotropic removal of the acetic acid by-product from the reaction mixture. Continued reduced pressure distillation gave 498 grams of pure 2,3-epoxy-2-ethylhexanol distilling at 58° C. at 0.3 mm. of Hg. Other properties determined were: $n$ 30/D=1.4375; purity by analysis with pyridine hydrochloride in chloroform=93 percent minimum. The yield of 2,3-epoxy-2-ethylhexanol was 76.6 percent based on the peracetic acid charge.

Reasonable variations and modifications of the instant invention can be made without departing from the spirit and scope thereof.

What is claimed is:

1. A process which comprises continuously introducing an ethylenically unsaturated compound and peracetic acid into an elongated reaction zone; said ethylenically unsaturated compound containing at least 3 carbon atoms and at least one ethylenic double bond in which the atoms directly joined to the ethylenic carbon atoms are of the group consisting of hydrogen and carbon; said elongated reaction zone having a length in the range of from 100 $\sqrt{4K/\pi}$ to 10,000 $\sqrt{4K/\pi}$, wherein K is the minimum area obtainable from a perpendicular cross sectional view of said zone, and wherein the expression $\sqrt{4K/\pi}$ is in the range of from 0.25 to 5.0 inches; under pressure sufficient to maintain a liquid phase reaction mixture; and for a residence time at least sufficient to introduce oxirane oxygen at the site of a carbon to carbon ethylenic bond of said ethylenically unsaturated compound, said residence time not exceeding about 45 minutes.

2. The process of claim 1 wherein the reaction is conducted at a temperature in the range of from about +20° to below about +130° C.

3. The process of claim 2 wherein said peracetic acid is employed as a solution in an inert organic medium.

4. A process which comprises continuously introducing an ethylenically unsaturated compound and peracetic acid into an elongated tubular reaction zone; said ethylenically unsaturated compound containing at least 3 carbon atoms and at least one ethylenic double bond in which the atoms directly joined to the ethylenic carbon atoms are of the group consisting of hydrogen and carbon; said peracetic acid being employed as a solution in an inert organic medium; said elongated reaction zone having a length in the range of from 100 D to 10,000 D, wherein D is in the range of from 0.25 to 5.0 inches and is the diameter of the circle obtained by a perpendicular cross section taken at the narrowest point along said zone; under pressure sufficient to maintain a liquid phase reaction mixture; and for a residence time at least sufficient to introduce oxirane oxygen at the site of a carbon to carbon ethylenic bond of said ethylenically unsaturated compound, said residence time not exceeding about 45 minutes.

5. The process of claim 4 wherein the reaction is conducted at a temperature in the range of from about +20° to below about +130° C.

6. The process of claim 5 wherein said ethylenic compound is a hydrocarbon which contains ethylenic unsaturation.

7. The process of claim 5 wherein ethylenic compound is an alcohol which contains ethylenic unsaturation.

8. The process of claim 5 wherein said ethylenic compound is an alkenyl-substituted phenol.

9. The process of claim 5 wherein said ethylenic compound is an ether which contains ethylenic unsaturation.

10. The process of claim 5 wherein said ethylenic compound is nitrogen-containing compound selected from the group consisting of amides, imides and nitriles which compounds contain ethylenic unsaturation.

11. The process of claim 5 wherein said ethylenic compound is an ethylenically unsaturated phosphoric ester.

12. The process of claim 5 wherein said ethylenic compound is a halogen-substituted hydrocarbon which contains ethylenic unsaturation, the ethylenic carbon atoms of which are free from halogen substituents.

13. The process of claim 5 wherein said ethylenic compound is an epoxyalkyl-substituted hydrocarbon which contains ethyenic unsaturation.

14. The process of claim 5 wherein said ethylenic compound is divinylbenzene.

15. The process of claim 5 wherein said ethylenic compound is propylene.

16. The process of claim 5 wherein said ethylenic compound is butylene.

17. The process of claim 5 wherein said ethylenic compound is styrene.

18. The process of claim 5 wherein said ethylenic compound is vinylcyclohexene.

References Cited in the file of this patent

UNITED STATES PATENTS

| | | |
|---|---|---|
| 2,414,385 | Milas | Jan. 14, 1947 |
| 2,457,328 | Swern | Dec. 28, 1948 |
| 2,458,484 | Terry | Jan. 4, 1949 |
| 2,567,237 | Scanlan | Sept. 11, 1951 |
| 2,567,930 | Findley | Sept. 18, 1951 |
| 2,583,569 | Herzfeld | Jan. 29, 1952 |
| 2,692,271 | Greenspan | Oct. 19, 1954 |
| 2,783,250 | Payne et al. | Feb. 26, 1957 |
| 2,785,185 | Phillips | Mar. 12, 1957 |
| 2,838,524 | Wilson | June 10, 1958 |
| 2,873,283 | Yang | Feb. 10, 1959 |

FOREIGN PATENTS

| | | |
|---|---|---|
| 525,888 | Canada | June 1956 |
| 769,127 | Great Britain | Feb. 27, 1957 |

OTHER REFERENCES

Boeseken et al.: Rec. Trav. Chim., vol. 52, pages 874–880 (1933).

Swern: JACS, vol. 69, pages 1692–98 (1947).

UNITED STATES PATENT OFFICE
CERTIFICATION OF CORRECTION

Patent No. 2,977,374                                            March 28, 1961

Benjamin Phillips et al.

It is hereby certified that error appears in the above numbered patent requiring correction and that the said Letters Patent should read as corrected below.

Column 3, line 23, for "trems" read --- terms ---; line 68, for "perssure" read --- pressure ---; column 8, line 22, for "conventioal" read --- conventional ---; line 48, for "produciton" read --- production ---; line 58, for "expoxidation" read --- epoxidation ---; column 12, line 52, for "period" read --- peracid ---.

Signed and sealed this 5th day of September 1961.

(SEAL)
Attest:

ERNEST W. SWIDER                                            DAVID L. LADD
Attesting Officer                                              Commissioner of Patents